United States Patent
Drumm et al.

(10) Patent No.: US 8,684,538 B2
(45) Date of Patent: Apr. 1, 2014

(54) IMAGE PROJECTION THROUGH GRID SCANNING OF A MODULATED LIGHT BEAM USING MIRRORS

(75) Inventors: Jan Oliver Drumm, Homburg (DE); Christian Gammer, Traitsching (DE); Jens Richter, Lappersdo (DE)

(73) Assignee: OSRAM Gesellschaft mit beschraenkter Haftung, Munich (DE)

( * ) Notice: Subject to any disclaimer, the term of this patent is extended or adjusted under 35 U.S.C. 154(b) by 304 days.

(21) Appl. No.: 13/121,412

(22) PCT Filed: Sep. 23, 2009

(86) PCT No.: PCT/EP2009/062325
§ 371 (c)(1),
(2), (4) Date: Jun. 6, 2011

(87) PCT Pub. No.: WO2010/034743
PCT Pub. Date: Apr. 1, 2010

(65) Prior Publication Data
US 2011/0227969 A1 Sep. 22, 2011

(30) Foreign Application Priority Data
Sep. 29, 2008 (DE) .......................... 10 2008 049 477

(51) Int. Cl.
*G03B 21/20* (2006.01)
(52) U.S. Cl.
USPC .................. 353/85; 353/30; 353/31; 353/94; 353/99; 353/121; 359/237; 359/242; 348/744

(58) Field of Classification Search
USPC .................. 353/30, 31, 34, 85, 94, 99, 121; 359/237, 242, 243, 259, 263, 264, 267; 348/742, 744–747, 771, E9.027; 349/5, 349/7–9
See application file for complete search history.

(56) References Cited

U.S. PATENT DOCUMENTS

| | | | |
|---|---|---|---|
| 4,717,925 A | 1/1988 | Shibata et al. | |
| 5,319,214 A * | 6/1994 | Gregory et al. | 250/504 R |
| 6,061,163 A | 5/2000 | Melville | |
| 6,406,148 B1 * | 6/2002 | Marshall et al. | 353/31 |
| 6,843,568 B2 | 1/2005 | Schenk et al. | |
| 7,156,522 B2 * | 1/2007 | Plut | 353/31 |
| 7,252,391 B2 * | 8/2007 | Dewald et al. | 353/84 |
| 7,303,291 B2 * | 12/2007 | Ikeda et al. | 353/102 |
| 2002/0180869 A1 | 12/2002 | Callison et al. | |
| 2003/0117689 A1 | 6/2003 | Helsel et al. | |
| 2003/0227677 A1 | 12/2003 | Doherty et al. | |
| 2006/0181653 A1 * | 8/2006 | Morgan | 348/771 |
| 2008/0111975 A1 | 5/2008 | Okamoto et al. | |
| 2008/0151195 A1 * | 6/2008 | Pacheco et al. | 353/30 |
| 2009/0161077 A1 * | 6/2009 | Maeda et al. | 353/31 |
| 2010/0149497 A1 | 6/2010 | Drumm et al. | |

FOREIGN PATENT DOCUMENTS

JP 2004279947 A 10/2004
WO 03032046 A1 4/2003
(Continued)

OTHER PUBLICATIONS

International Search Report of PCT/EP2009/062325 dated Dec. 4, 2009.

(Continued)

*Primary Examiner* — Sultan Chowdhury

(57) ABSTRACT

In various embodiments, a method for projecting at least one light beam is provided. The method may include providing at least one light beam; and setting a time base of a processor configured to control the at least one light beam as a function of a deflection of the at least one light beam.

13 Claims, 2 Drawing Sheets

(56) References Cited

FOREIGN PATENT DOCUMENTS

| WO | 2005078508 | A2 | 8/2005 |
| WO | 2005121866 | A1 | 12/2005 |
| WO | 2007146093 | A2 | 12/2007 |
| WO | 2008058671 | A2 | 5/2008 |

OTHER PUBLICATIONS

English abstract of JP 2004279947 A.
Wang et al: "Implementation of phase-locked loop control for MEMS scanning mirror using DSP"; Sensors and Actuators A; vol. 133; No. 1; Dec. 20, 2006; pp. 243-249.

* cited by examiner

IMAGE PROJECTION THROUGH GRID SCANNING OF A MODULATED LIGHT BEAM USING MIRRORS

RELATED APPLICATIONS

The present application is a national stage entry according to 35 U.S.C. §371 of PCT application No.: PCT/EP2009/062325 filed on Sep. 23, 2009, which claims priority from German application No.: 10 2008 049 477.1 filed on Sep. 29, 2008.

TECHNICAL FIELD

The invention relates to a method and a device for projecting at least one light beam.

Various embodiments relate to a method and a device for projecting at least one light beam.

BACKGROUND

In projectors based on what is referred to as a "flying spot" principle of operation, light beams (typically consisting of the three primary colors red, green and blue) are deflected by means of a two-dimensional resonant micromirror and projected onto an image plane.

In a "flying spot" projection, light beams of different colors e.g. from laser sources (red R, blue B and green G) are in each case directed onto a semitransparent mirror (transmission and reflection of the mirrors are dependent on the wavelength) and then as a common beam (also referred to as a projection beam) onto a two-dimensional resonant micromirror which deflects the common beam two-dimensionally and projects it onto an image plane. In the process the image is built up in the image plane by means of the continuously harmonically deflected common beam.

Image information is generated and displayed synchronously with the deflection of the micromirror by means of intensity modulation of the respective light source.

As a result of the movement of the mirror, e.g. by means of line scan methods or Lissajous methods, and correspondingly suitable modulation of the laser intensity it is thus possible to generate the desired image information on the screen. The mirrors can be embodied e.g. as what are termed MEMS mirrors.

Image jitter effects (e.g. an image running through continuously horizontally or vertically) occur when the actual frequency of the mirror movement (row or column frequency) does not correspond to the reference frequency for the mirror movement set in the video electronics. If there is a difference between reference and actual frequency of the mirror, the maximum mirror deflection is not reached. The intensity of the effect is dependent on the production quality of the mirrors (manufacturing-induced reference frequency deviation). Image jitter effects can also occur as a result of a change in the ambient conditions (e.g. temperature, air pressure, atmospheric humidity, etc.) (environment-induced reference frequency deviation).

It is known that the drive frequency of the fast axis of the beam deflection system correctively adjusts its mechanical resonant frequency and is used as a time base. The corrective adjustment of the frequency is necessary in order to keep the geometric size of the projected image constant. The time base causes a trigger signal to be sent to the data processing unit (DPU), which has a fixed system clock, e.g. after each reversal of direction of the mirror's rotational movement in order to start the intensity modulation of the laser beams along a row.

This method has the disadvantage that if the frequency of the time base is changed (e.g. as a result of a thermal drift of the mechanical resonance), image information at the end of the row will be truncated or rows will be displayed compressed.

This leads to a reduction in the quality of the projected image.

SUMMARY

Various embodiments may avoid the above-cited disadvantages and provide e.g. an efficient and improved means of drift compensation during a projection of a light beam.

Various embodiments provide a method for projecting at least one light beam wherein a time base (e.g. a clock frequency) of a processor configured to control the at least one light beam is set as a function of a deflection of the at least one light beam.

Accordingly a deflection of the at least one light beam may be used as a trigger and/or as a time base for controlling the at least one light beam.

The processing unit may include a processor, a controller and/or a programmable logic array.

According to a development of the invention the at least one light beam is deflected with the aid of a deflecting projection device, in particular with the aid of a mirror or a micromirror.

The deflecting projection device may be in particular a two-dimensional resonant micromirror.

Two one-dimensional mirrors can also be used instead of the two-dimensional mirror. In particular the two axes can have resonant frequencies, in which case the two axes do not always have to be driven resonantly. For example, if the slow axis is driven quasi-statically, this is referred to as a line scan method. If the two axes are driven resonantly, this is equivalent to a Lissajous method.

Another development is that the deflection is determined and/or measured with the aid of a mirror unit.

The mirror unit includes in particular the deflecting projection unit (e.g. a mirror), a driver for the deflecting projection unit, means for measuring and/or analyzing movements or positions of the deflecting projection unit, if necessary with a means for conditioning a measured signal, and a signal converter.

In particular it is a development that a deflection of the deflecting projection unit, in particular a drive frequency of a fast axis of the deflecting projection device, is correctively adjusted by means of a controller and in this way the time base of the processing unit is set.

It is also a development that the drive frequency of the fast axis of the deflecting projection device is set by means of a reference signal, taking into account mechanical properties of the deflecting projection device.

In particular the reference signal can specify a phase value.

A further development is that a ratio between the drive frequency of the fast axis and a drive frequency of a slow axis of the deflecting projection device is kept essentially constant by means of the controller.

Within the scope of an additional development a temporal modulation of the intensity of the at least one light beam is performed with the aid of the processing unit.

A next development is that the processing unit feeds back an output signal as a function of the deflection of the at least one light beam.

In particular the processing unit can be part of a closed-loop control system. For example, the processing unit can provide a voltage-controlled oscillator (VCO) with a digital signal, an output signal of the voltage-controlled oscillator being used for setting the time base of the processing unit.

It is also possible for the processing unit to be independent of the closed-loop control system—in particular not to be part of the control loop of the closed-loop control system—and to be controlled only via the deflection of the at least one light beam. This control function can be effected e.g. using a value determined by the voltage-controlled oscillator.

The processing unit may include e.g. a DLL element for converting an input signal into an adjusted time base or clock frequency.

According to one embodiment the at least one light beam is composed of at least one light source.

In particular the at least one light source may include at least one laser, in particular at least one laser diode. The light beam may be composed e.g. of a red, a blue and one or two green lasers.

According to an alternative embodiment the at least one light beam is projected by means of a flying-spot method.

In particular a line scan method and/or a Lissajous method may be used.

The above-stated object is also achieved by means of a device for projecting at least one light beam, said device including a processor unit and/or a hardwired circuit arrangement and/or a freely programmable logic array which is configured in such a way that the herein-described method can be performed.

The above-stated object is also achieved by means of a device for projecting at least one light beam, the device
  including a processing unit for controlling the at least one light beam,
  including a unit for determining a deflection of the at least one light beam,
  wherein a time base of the processing unit can be set as a function of the deflection of the at least one light beam.

According to an embodiment the unit for determining the deflection of the at least one light beam keeps the deflection of the at least one light beam essentially constant by means of a controller.

In particular the controller may drive a voltage-controlled oscillator which is connected to the processing unit and provides the latter with a voltage as a function of the deflection of the at least one light beam. A DLL element of the processing unit scales the time base of the processing unit in accordance with the signal provided by the voltage-controlled oscillator.

According to a next embodiment the components of the device are implemented at least in part as discrete components and/or are embodied at least in part as an integrated solution.

According to another embodiment a communication with the processing unit and a further processing unit is effected by means of a ring buffer and/or by means of a dual-port RAM.

A decoupling of different time bases or clock rates is advantageously possible by this means.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DETAILED DESCRIPTION

The following detailed description refers to the accompanying drawings that show, by way of illustration, specific details and embodiments in which the invention may be practiced.

With the present approach a drive frequency of a fast axis of the beam deflection system can correctively adjust its mechanical resonant frequency and be used as a time base.

In addition control electronics is provided with the aid of which a ratio between a time base or clock frequency of a processor unit (also designated as "DPU") and the time base is kept constant.

The processor unit may include a processor or a programmable logic array.

In addition the ratio of the drive frequencies of slow (e.g. quasi-static drive) and fast axis can be kept constant. With the approach described here, the image impression (resolution capacity) remains essentially unchanged even with changing or initially different frequencies of the fast axis. In this respect in particular no disruptions or distortions are perceivable by the user.

The temporal modulation of the laser intensity is adjusted to the movement of the mirror in order to ensure the most distortion-free image display possible and in order to avoid image jitter effects. For this purpose the time base or clock frequency of the DPU is correctively adjusted.

Figure 1:
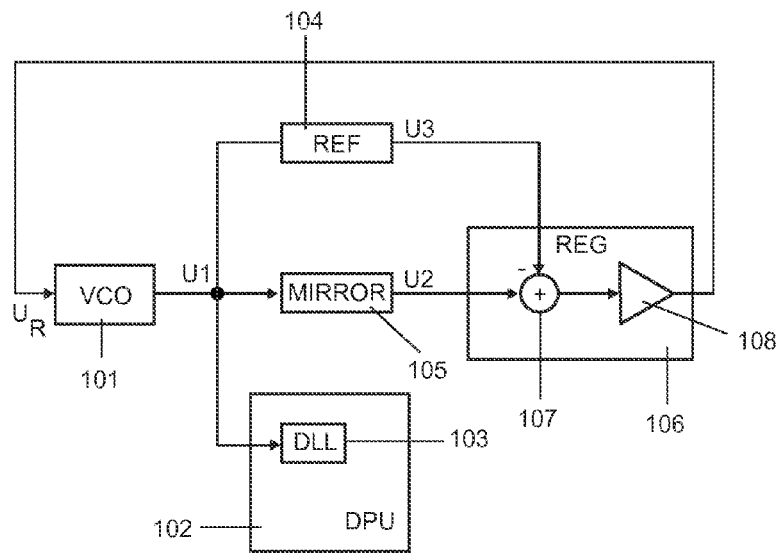
FIG. 1 is a block diagram of a circuit for controlling a clock of a processing unit (DPU) as a function of a deflection of at least one light beam.

FIG. 1 shows a block diagram of a circuit for controlling a DPU clock.

A voltage-controlled oscillator VCO 101 provides at its output a signal U1 which is connected to an input of a reference system REF 104, to an input of a mirror unit MIRROR 105 and to an input of a DLL element 103 of a DPU 102.

At the output of the mirror unit MIRROR 105 a signal U2 is supplied to an adder unit 107 of a controller REG 106. At the output of the reference system REF 104 a signal U3 with negative sign is supplied to the adder unit 107.

The controller REG 106 also includes an integrator 108 which is connected to the output of the adder unit 107. The output of the integrator 108 is connected to the input of the VCO 101.

The light source, e.g. laser, is driven by means of the DPU 102. In particular the DLL element multiplies the signal U1 and in this way determines the clock base for the laser.

The time base or clock frequency of the DPU 102 is controlled via a closed-loop control system that is independent of the DPU 102.

After being switched on the VCO 101 runs at its fundamental frequency $f1=f0$ because no signal $U_R$ is present at its input. The VCO 101 supplies the output signal $U1(f1)$ which is converted in the mirror unit MIRROR 105 into a suitable drive signal for the fast mirror axis. The movement of the mirror is measured and provided as the signal $U2(f1)$.

The reference system REF 104 supplies a delayed (phase-shifted) signal U3(f1). The signals U3 and U2 are subtracted by means of the adder unit 107 and their phasing is compared in the controller REG 106. The controller REG 106 generates therefrom the signal $U_R$ which is routed to the input of the VCO 101.

If the signal $U_R$ is not equal to zero, the corrective adjustment of the mirror frequency (fast axis) is active. The DPU clock frequency f2 is generated via the signal U1 routed to the DLL element 103. Thus, the ratio of f2/f1 is essentially constant and the fast axis of the mirror is accordingly in a resonant mode of operation.

The frequency f1 of the signal U1 corresponds to the movement frequency of the fast axis of the mirror system and ranges between 15 kHz and 50 kHz. The bandwidth of the as-manufactured distribution of a mirror type usually lies in the range of +/−1-2%, and the clock rate of a DPU typically lies in the range of 10 MHz to 400 MHz. From this, an as-manufactured distribution of 29.4 kHz to 30.6 kHz is calculated e.g. for a mirror type with a targeted fundamental frequency of 30 kHz. At a typical clock rate of 180 MHz this means that the ratio of f2/f1 is constant=6000. The variation in the clock rate consequently lies in a frequency band of 176 MHz to 184 MHz.

Individual blocks shown in FIG. 1 are described in more detail below:

VCO 101:
  The VCO 101 generates a clock f1 which is dependent on the input signal $U_R$:

$$f1 = f0 + k_{VCO} \cdot U_R,$$

where $k_{VCO}$ is a constant of the VCO 101.
  The signal $U_R$ can also be negative, such that the clock f0 represents an average frequency. The VCO supplies an output signal U1(f1).

Mirror Unit MIRROR 105:
  The mirror unit MIRROR 105 includes in particular a mirror, a mirror driver, means for measuring and/or analyzing mirror values or mirror movements (feedback of the mirror), if necessary with a means for conditioning the measured signal, and a signal converter.
  The mirror can be driven inductively, capacitively, piezo-resistively or electromechanically. By analyzing a capacitive, inductive, optical or electromechanical measured variable the measurement system (mirror feedback) can supply a signal which allows deductions to be made about the movement of the mirror. The signal conditioning effects an additional level adjustment and noise filtering of the measured signal.
  The mirror unit MIRROR 105 supplies the output signal U2(f1).

Reference System REF 104:
  The reference system REF 104 enables a phase shift of the input signal U(f1) by a selectable phase value.
  The phase value to be set is dependent on mechanical properties of the mirror and typically lies at approx. 90°.
  The reference system REF 104 supplies an output signal U3(f1).

DPU 102:
  The DPU 102 can process incoming video data and pass on modulation signals to the laser driver(s) in accordance with a predefined/implemented algorithm which is optimized in particular in terms of a predefined ratio between DPU clock frequency and frequency of the fast mirror axis.

DLL Element 103:
  The DLL element 103 is preferably integrated in the DPU 102 and scales the clock frequency output by the VCO 101 according to the specified ratio between the two clocks.

Controller REG 106:
  The function of the controller REG 106 is to compare the input signals U2 and U3 in terms of their phase position and, depending on the deviation, to generate a suitable signal (the control voltage in the form of the signal $U_R$).
  In the scenario presented here by way of example, the signals U3 and U2 are subtracted and a downstream integrator 108 determines a measure for the deviation of the phase position and provides this in the form of the signal $U_R$ which is routed to the input of the VCO 101.

In particular the following embodiments or variations are possible:

(1) The arrangement according to FIG. 1 can be built from discrete components, including the DPU 102, the VCO 101, the controller REG 106, the mirror unit MIRROR 105 (in particular with mirror driver and/or measuring arrangement) and the reference system REF 104.

(2) The arrangement according to FIG. 1 may be implemented as an integrated solution, e.g. in the form of an integrated electronic single-chip solution in combination with the mirror.

(3) The arrangement according to FIG. 1 includes semiconductor elements and may be implemented as an integrated structure including e.g. the VCO 101, the controller REG 106, the mirror unit MIRROR 105 (or parts of the same) and the reference system REF 104.

(4) In addition, in the arrangement according to FIG. 1, a frequency ratio of fast axis to slow axis can be kept constant.

Figure 2:
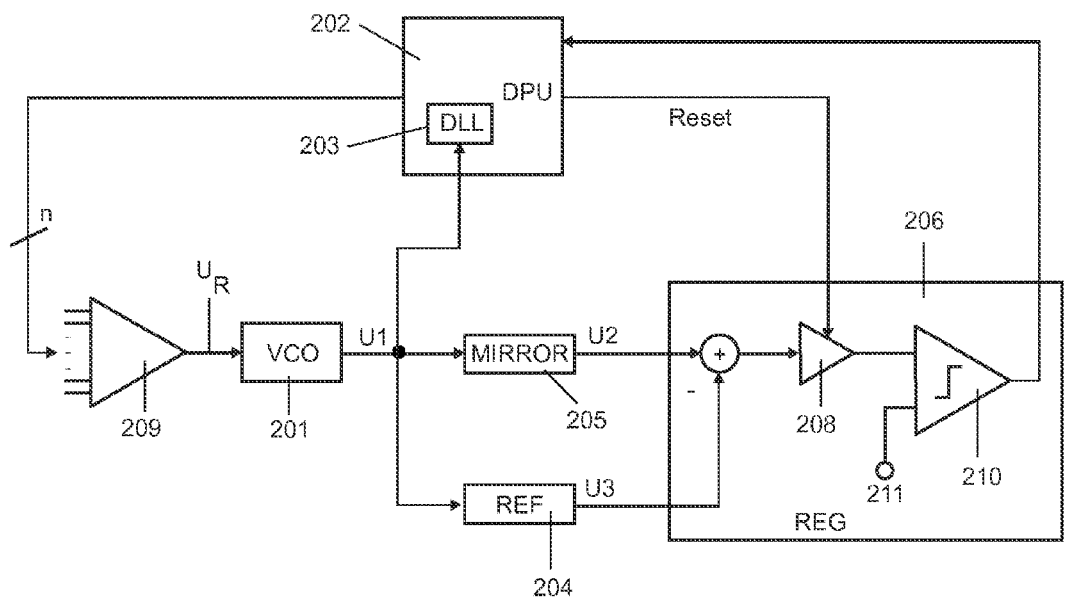
FIG. 2 is a block diagram of a circuit for controlling a clock of a processing unit (DPU) as a function of a deflection of at least one light beam, wherein in contrast to FIG. 1 the processing unit is integrated into the closed-loop control system.

As a further embodiment FIG. 2 shows a block diagram of the DPU clock control arrangement, wherein in contrast to FIG. 1 a DPU is integrated into the closed-loop control system.

Thus, FIG. 2 shows a VCO 201 which at its output provides a signal U1 which is connected to an input of a reference system REF 204, to an input of a mirror unit MIRROR 205, and to an input of a DLL element 203 of a DPU 202.

At the output of the mirror unit MIRROR 205 a signal U2 is supplied to an adder unit 207 of a controller REG 206. At the output of the reference system REF 204 a signal U3 with negative sign is supplied to the adder unit 207.

The controller REG 206 additionally includes an integrator 208 which is connected to the output of the adder unit 207. The output of the integrator 208 is connected to a first input of a comparator 210 (which is also provided in the controller REG 206) at the second input of which a reference value 211 is present. The output of the comparator 210 is connected to the DPU 202.

The DPU 202 has an output which is connected to the integrator 208 and is used for resetting the integrator 208 ("Reset").

In addition an output of the DPU 202 is connected to a quantizer unit 209. The quantizer unit 209 includes in particular a digital/analog converter for converting an n-bit signal of the DPU 202 into an analog signal $U_R$.

Thus, the circuit according to FIG. 2 differs from the circuit according to FIG. 1 in particular in that the output of the controller REG 206 is not routed directly to the VCO 201, but is relayed via the DPU 202.

The DPU 202 performs a reset of the integrator 208 in particular after a rising edge of the input signals U2 and U3. If the difference between U3 and U2 represents a positive deviation, the controller REG 206 supplies logic "1" as output signal to the DPU 202, otherwise logic "0".

The output signal of the controller REG 206 may also turn out inverted, depending on an implementation of a control algorithm.

For example, an implementation may be embodied such that logic "0" at the output of the controller REG 206 causes an increase in frequency, in other words an increase in the signal $U_R$. For this purpose an increased digital value n is sent to the quantizer unit 209 by the DPU 202. The quantizer unit 209 converts the digital value into an analog signal $U_R$ which has a higher value than the previous value of the signal $U_R$.

Similarly, logic "1" at the output of the controller REG 206 leads to a signal $U_R$ with reduced value.

Figure 3:
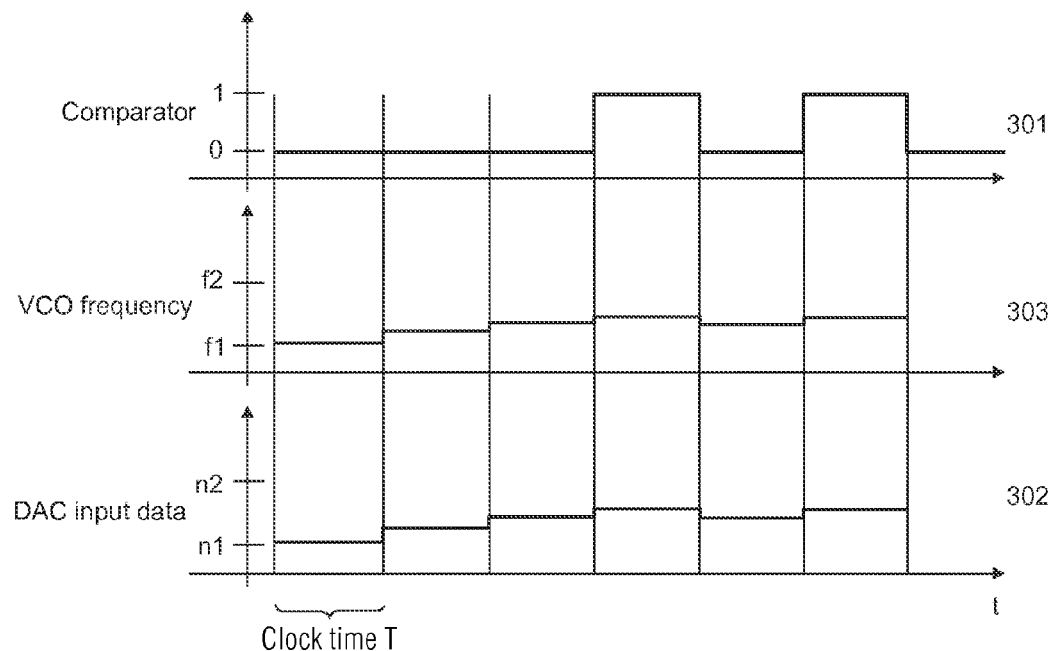
FIG. 3 shows signal waveforms of the control according to FIG. 2 as a function of a clock having a clock time T.

FIG. 3 shows signal waveforms of the control arrangement according to FIG. 2 as a function of a clock having a clock time T. A graph 301 shows by way of example a signal at the output of the comparator 210, a graph 302 an associated signal at the input of the quantizer unit 209, and a graph 303 a corresponding signal U1 at the output of the VCO 201.

With regard to possible embodiments or variations, the remarks made above with reference to FIG. 1 apply analogously. In addition the quantizer unit 209 and/or the comparator 210 can be implemented accordingly as discrete elements and/or as an integrated element.

Communication of the DPU

With regard to a communication of the DPU with further modules it is necessary to take into account in certain cases that an asynchronous data communication may be required in order to decouple the different clock bases.

Figure 4:
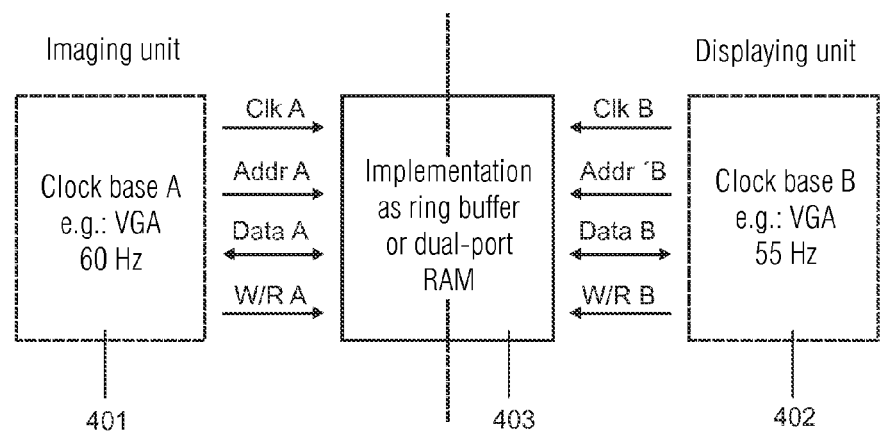
FIG. 4 is a block diagram for illustrating an asynchronous data communication by means of a ring buffer or a dual-port RAM.

FIG. 4 shows a block diagram for illustrating an asynchronous data communication by means of a ring buffer or a dual-port RAM.

For example, FIG. 4 shows an imaging unit 401 which has a clock base A at a level of 60 Hz. A displaying unit 402 has a clock base B at a level of 55 Hz. Arranged between the imaging unit 401 and the displaying unit 402 is a dual-port RAM 403. The dual-port RAM 403 comprises two ports A and B having separate address and data bus systems, wherein both ports can access the same memory area.

The dual-port RAM 403 is provided with a clock signal "Clk A", an address signal "Addr A", and a read/write signal "W/R A" by the imaging unit 401. In addition data "Data A" is exchanged between the dual-port RAM 403 and the imaging unit 401. The dual-port RAM 403 is provided with a clock signal "Clk B", an address signal "Addr B", and a read/write signal "W/R B" by the displaying unit 402. In addition data "Data B" is exchanged between the dual-port RAM 403 and the displaying unit 402.

Each port A and/or B enables data to be read from the memory and data to be written to the memory via different control signals. Owing to the separate clock inputs data may be written and/or read at different speeds at the two ports. For example, while the image data required for display purposes is read out at port B, new image data may already be written into the memory via the second address bus at port A.

Further Advantages

The approach presented here enables manufacturing-related tolerances of the mirror frequency and environment-related changes in the mirror frequency to be compensated. Said compensation is independent of an image-generating algorithm, in particular the image-generating algorithm is independent of the mirror frequency.

Furthermore, the proposed solution enables the image resolution to be increased and image jitter effects to be avoided or reduced.

A smaller and/or low-cost implementation and/or design of the data processing unit is also made possible.

A further advantage is the reduced power consumption of the data processing unit.

An increase in mirror production yield and projector production yield is achieved as a result of the proposed compensation.

Overall, a scattering of the image quality referred to a total volume of projectors can be reduced.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

LIST OF REFERENCE SIGNS

101 VCO (Voltage-Controlled Oscillator)
102 DPU (Data Processing Unit, processing unit)
103 DLL (Delay-Locked Loop) element
104 Reference system REF
105 Mirror unit MIRROR
106 Controller REG
107 Adder unit (summation element)
108 Integrator
201 VCO (Voltage-Controlled Oscillator)
202 DPU (Data Processing Unit)
203 DLL (Delay-Locked Loop) element
204 Reference system REF
205 Mirror unit MIRROR
206 Controller REG
207 Adder unit (summation element)
208 Integrator
209 Quantizer unit (comprising e.g. digital/analog converter)
210 Comparator
211 Reference value
301 Graph: signal at the output of the comparator 210
302 Graph: signal at the input of the quantizer unit 209
303 Graph: signal U1 at the output of the VCO 201
401 Imaging unit
402 Displaying unit
403 Dual-port RAM

The invention claimed is:

1. A method for projecting at least one light beam, the method comprising: providing at least one light beam; and temporally modulating the intensity of the at least one light beam with the aid of a processor; deflecting the at least one light beam with the aid of a deflecting projection structure; wherein the deflection is at least one of determined and measured with the aid of a mirror structure; and setting a time base of a processor configured to control the at least one light beam as a function of a deflection of the at least one light beam.

2. The method as claimed in claim 1,
wherein a deflection of the deflecting projection structure is correctively adjusted by means of a controller and in this way the time base of the processor is set.

3. The method as claimed in claim 2,
wherein a drive frequency of a fast axis of the deflecting projection structure is correctively adjusted by means of a controller and in this way the time base of the processor is set.

4. The method as claimed in claim 3,
wherein the drive frequency of the fast axis of the deflecting projection structure is set by means of a reference signal, taking into account mechanical properties of the deflecting projection structure.

5. The method as claimed in claim 3,
wherein a ratio between the drive frequency of the fast axis and a drive frequency of a slow axis of the deflecting projection structure is kept essentially constant by means of the controller.

6. The method as claimed in claim 1,
wherein the processor feeds back an output signal as a function of the deflection of the at least one light beam.

7. The method as claimed in claim 1,
wherein the at least one light beam is composed of at least one light source.

8. The method as claimed in claim 1,
wherein the at least one light beam is projected by means of a flying-spot method.

9. The method as claimed in claim 1,
wherein the at least one light beam is deflected with the aid of a mirror or a micromirror.

10. A device for projecting at least one light beam, the device comprising: at least one of a processor unit; a hardwired circuit arrangement; and a freely programmable logic array being configured to carry out a method for projecting at least one light beam, the method comprising: providing at least one light beam; and temporally modulating the intensity of the at least one light beam with the aid of a processor; deflecting the at least one light beam with the aid of a deflecting projection structure; wherein the deflection is at least one of determined and measured with the aid of a mirror structure; and setting a time base of a processor configured to control the at least one light beam as a function of a deflection of the at least one light beam.

11. The device as claimed in claim 10,
wherein the structure is configured to determine the deflection of the at least one light beam is further configured to keep the deflection of the at least one light beam essentially constant by means of a controller.

12. The device as claimed in claim 10,
the components of which are implemented at least one of at least in part as discrete components and at least in part as an integrated solution.

13. The device as claimed in claim 10,
wherein a communication with the processor and a further processor is effected at least one of by means of a ring buffer and by means of a dual-port RAM.

* * * * *